March 5, 1968 R. S. McGRATH ETAL 3,372,037

MAGNETIC MATERIALS

Filed June 30, 1965

INVENTORS
RICHARD S. MCGRATH
NORMAN W. SILCOX

BY Bertram M. Mullin

ATTORNEY

United States Patent Office 3,372,037

Patented Mar. 5, 1968

3,372,037

MAGNETIC MATERIALS

Richard S. McGrath, Hopewell Junction, and Norman W. Silcox, Poughkeepsie, N.Y., assignors to International Business Machines Corporation, Armonk, N.Y., a corporation of New York Filed June 30, 1965, Ser. No. 468,355
10 Claims. (Cl. 106—1)

ABSTRACT OF THE DISCLOSURE

A process and plating bath for electrolessly plating a nickel-iron magnetic material comprising nickel ions, hypophosphite ions, hydroxyl ions and ferric ions.

This invention relates to magntic thin films and, in particular, to an improved process for electrolessly forming magnetic thin films for adaptation as storage and switching elements in data processing and computer machines.

Within the relatively recent past, the computer industry has shifted much of its attention from ferrimagnetic ferrite core materials for storage and switching applications, to magnetic thin films of the Permalloy type. What has caused this change is that the latter material—the magnetic thin film—exhibits the intriguing property of coherent spin rotation. This process, in theory, is both simpler to understand and easier to control than its counterpart, domain wall rotation, which is a mechanism observed in the switching of ferrimagnetic devices. Furthermore, coherent magnetization rotation is very fast. It is possible to change the orientation of the magnetic dipoles through an angle of 90° in the order of nanoseconds ($10^{-9}$ seconds). Furthermore, the planar geometry of thin films lends itself to inexpensive constructional techniques and to mass fabrication. Now, since computers must deal with vast quantities of information which must be readily accessible upon interrogation or for computation, the factors of speed and economy are most inviting to the industry.

Although there is agreement as to the properties and characteristics required in magnetic thin films, difficulties have been encountered in producing the same. As previously mentioned, while the Permalloy films, that is, magnetic thin films containing from 15% to 45% by weight iron and 55% to 85% by weight nickel, are known to undergo magnetization reversal by the process of coherent spin rotation, this process, however, does not occur to any great extent in materials having a thickness greater than about 10,000 A.: this is about the lower limit of conventional metal rolling techniques and attempts at rolling magnetic thin films have not proven fruitful. The material breaks up into a fine network, or, after rolling, it is easily distorted, and distortion introduces adverse changes in the magnetic properties. Thus, in search for a solution to the problem, a number of fabrication processes have been investigated, included among which are found vacuum deposition, electroplating, cathodic sputtering, and pyrolytic deposition, all of these are amply described in the prior art.

One process with which many of the fabrication problems have been overcome is that of chemical reduction or electroless plating. Such a process is the subject of copending patent applications, Ser. No. 353,849 filed Mar. 23, 1964, to Arnold F. Schmeckenbecher, and patent application Ser. No. 419,669 filed Dec. 21, 1964, to R. S. McGrath and N. W. Silcox; both applications are assigned to the assignee of the instant application. As brought out in the heretofore mentioned patent applications, nickel, nickel-cobalt, and other metal alloy films have been deposited on active or catalytic surfaces by the reduction of their metal salts with hypophosphite. But, few advances were made in the chemical reduction of Permalloy type films on substrates for computer applications until the advent of the heretofore mentioned patent applications. Prior thereto, in those instances where nickel-iron films or Permalloy type films were deposited electrolessly, the resulting films were disturb-sensitive and exhibited a low one-to-zero difference signal. The former property, disturb-sensitivity, is a measure of the ability of the film to remain in a selected remanent state in the presence of stray fields. The more disturb-sensitive a film is, the more precisely must the switching field conform to specified parameters. The latter quantity, the one-to-zero difference signal, is a measure of the signal available for sensing intelligence upon interrogation: the lower that signal is, the more difficult it becomes to accurately discriminate between noise and intelligence signals, and the greater are the demands placed upon the sensing circuits.

In the first of these heretofore mentioned patent applications, that is, that of Arnold F. Schmeckenbecher, it is shown that many of the shortcomings previously encountered are circumvented, when Permalloy type films are grown by a chemical reduction process, employing an electroless solution, wherein the hypophosphite ion concentration is maintained below 7.00 grams per liter and the pH of the electroless solution adjusted to at least 8. While the reasons for the success experienced with the process and electroless solution are not well understood, a working hypothesis has been advanced which does provide some insight to what occurs. It is believed that in the electroless solution containing 7.00 grams per liter hypophosphite ions or less that the plating rate, that is, the rate at which the cations are chemically reduced as metal upon the substrate, is lower than that obtained with higher concentrations of the hypophosphite; more opportunity is thus provided for interaction and growth of secondary chemical constituents and these reactions favor high resistivity in the electroless deposit and tend to inhibit eddy current formations. As an end result, a given quantity of energy exerted to drive the magnetic dipoles switches or rotates more of the film than in the absence of these conditions. The hypothesis has been extended to the pH requirements: from experience and theoretical considerations it is found that where the pH is lower than 8, that very little iron is deposited in the film notwithstanding that the concentration of iron in solution is much higher than this. Optimum results are achieved when the initial pH is adjusted to 10 or above. Within these limitations of hypophosphite concentration and pH, magnetic thin films are obtained which when utilized as computer devices exhibit vastly improved performance over films heretofore known in the prior art.

In the second of the heretofore mentioned patent applications, that is, that of McGrath and Silcox, it is shown that further improvements are available with the electroless solution and process when selected concentrations of ferric ions are incorporated into the electroless solution. The addition of ferric ions, it has been discovered, further increases the one-to-zero difference signal, further decreases disturb-sensitivity, and promotes a more uniform crystallite grain size than that observed with the former of the patent application processes. All of these additional attributes permit greater speed, increased reliability, and more consistent device characteristics.

But, with the ever-increasing requirements of both science and industry, greater demands are continually being placed upon computers while, simultaneously therewith, computers are being called upon to operate under increasingly deleterious environmental conditions. The magnetic thin film thus experiences a variety of stresses that arise from thermal and temperature gradients usually not encountered in the more conventional environments for which computers were previously developed. While some stress is tolerable, once the stress passes the threshold level for the magnetic thin film, serious losses in signal output occur, which is accompanied by a general degradation in film disturb-sensitivity characteristics. What has now been discovered is that many of the problems that are an outgrowth of these deleterious environmental conditions are obviated or circumvented by utilizing an aqueous soluble salt of iron in the electroless plating solution, which salt, upon ionization, releases ferric cations in contrast to the previous solutions, wherein ferrous cations or combinations of both ferrous and ferric cations were used. It is surprisingly found that the utilization of such a salt produces magnetic thin films having a stress threshold level that far exceeds that heretofore known in the art. Moreover, additional advantages are noted to come from the use of the ferric ions in that skew and dispersion in the film are lowered, thus leading to increased reliability and lower power requirements for driving the magnetic device. Thus, with the present invention, magnetic thin film storage and switching devices are available for operation under adverse environmental conditions with a level of operational predictability heretofore not known in the art.

Accordingly, it is a primary object of this invention to provide an improved chemical reduction process for electrolessly depositing magnetic thin films suitable for computer application.

It is yet another object of this invention to provide an improved process for producing magnetic storage and switching elements having enhanced magnetic properties.

It is still another object of this invention to provide an electroless solution for chemically depositing magnetic thin films with improved magnetic properties.

It is still a further object of this invention to provide an economical and commercially feasible chemical reduction process for producing magnetic thin films with reproducibility and uniformity of characteristics.

These and other objects are realized with a new and improved electroless plating solution that contains an alkaline aqueous solution of nickel and ferric ions wherein the molar ratio of the nickel [Ni (II)] cations to the ferric [Fe (III)] cations is between 4:1::31:1 and further containing up to about $100 \times 10^{-3}$ mols per liter of hypophosphite ions and sufficient hydroxyl anions to adjust the initial pH at about 8. The process is based upon the controlled autocatalytic reduction of the nickel and iron by the reductant, the hypophosphite anions. Nickel-iron-phosphorus alloys are chemically deposited from the electroless solution by placing into contact therewith substrates which are composed of copper, nickel, cobalt, iron, steel, aluminum, zinc, palladium, platinum, brass, manganese, chromium, molybdenum, tungsten, titanium, tin, silver, carbon or graphite or alloys containing combinations thereof. The catalytic properties of these materials which are inherent or activated by techniques hereafter discussed, brings about a reduction of the nickel and iron to the nickel-iron-phosphorus alloys by the hypophosphite. Of course it will be realized by those versed in the art that non-catalytic surfaces such as non-metallic materials are amenable to the process provided the surface of the non-catalytic material is sensitized or activated, such as by forming a film of one of the catalytic ions on the surface thereof. This is accomplished by a variety of techniques which are well known to those skilled in the art.

When electrolessly plating nickel and iron in the alkaline solution, the presence of compound-forming water soluble nickel complexes is necessary in order to prevent the precipitation of the nickel as a hydroxide or hypophosphite. The precipitation is avoided with the addition of sufficient ammonia molecules in the form of ammonia salts which form the nickel hexamine complex ion. To arrest the precipitation of the ferric ion as ferrous ions, tartrate ions are added to the solution. The activity of the hypophosphite ion is regulated by adjusting the free alkaline content, as measured by the hydroxyl anion concentration of the solution, with the addition of sodium hydroxide, ammonium hydroxide, or other bases which are well known in the art.

It will be recognized by those versed in the art that other complexing or sequestering agents are usable in place of the ammonia and tartrate ions. These include organic complex forming agents containing one or more of the following functional groups: primary amino group ($—NH_2$), secondary amino group ($>NH$), tertiary amino group ($>N—$), imino group ($=NH$), carboxy group ($—COOH$), and hydroxy group ($—OH$). The preferred agents are Rochelle salt, seignette salt, tartaric acid, ammonia, ammonium hydroxide and ammonium chloride. Related polyamines and N-carboxyl methyl derivatives thereof are also usable in the process. However, cyanides, on the other hand, are deleterious in that the plating process does not function in their presence. The nickel and iron are added in the form of any water soluble salt, the criterion being that the salt is not antagonistic to the plating solution and that it furnish nickelous cations and ferric cations.

In carrying out the electroless plating process, the article that is to undergo plating, that is, the catalytic surface, is properly prepared by mechanical cleaning and degreasing techniques in accordance with standard practice in the industry. If the surface that is to receive the electroless deposit is formed of copper or copper alloy, the article is then further cleaned by immersing the same in a 10% solution of hydrochloric acid for about 30 seconds at room temperature. It is then immersed in a 0.1% palladium chloride solution for about 15 seconds at room temperature. As a result of the exchange reaction $$Metal^0 + Pd^{++} = Metal^{n+} + Pd^0$$

palladium is deposited on the catalytic surface. It acts as a catalyst to initiate the reduction of the nickel and iron by the reductant which is the hypophosphite.

The catalytic surface—that terminology is hereafter used to include those materials which contain surfaces which are inherently catalytic in the electroless solution, or are made to behave as such by well known techniques in the art—is exposed to the electroless plating solution for a sufficient period of time to permit the formation of a nickel-iron-phosphorus alloy on the surface thereof. To induce a direction of easy magnetization or preferred anisotropy, the electroless plating is conducted in the presence of a magnetic field. Isotropic properties, that is, magnetic properties that are the same in every direction along the surface of the film, are also available with the electroless plating technique in accordance with the invention. As those versed in the art will recognize, the external field is not applied when isotropic properties are sought.

The magnetic thin films produced from the electroless process heretofore described exhibit unique characteristics which are most desirable for application as computer and data processing storage and switching devices. Magnetic thin films contain from about 15% to 35% by weight iron, about 65% to about 85% by weight nickel, and about 0.25% to about 2% by weight phosphorus, with it being preferred to have a magnetic thin film that contains from about 28% to 30% by weight iron and about 70% to 72% by weight nickel. The magnetic thin film shows a face-centered-cubic structure; with an electron microscope at 40,000×, the film appears as an agglomeration of spheres with the diameter in the order of about 1000 A. Films in thicknesses of about 20,000 A. when exposed to driving fields of the order of 20 oersteds switch their magnetization within relatively short periods of time in the order of 2 to 6 nanoseconds. Large one-to-zero difference signals, low disturb-sensitivity, uniformity of resultant product and improved enhanced magnetic characteristics are the attributes of the electroless plating process and solution.

The foregoing and other objects, features and advantages of this invention will be apparent from the following more particular description of the preferred embodiment of the invention as illustrated in the accompanying drawings.

Figure 1:
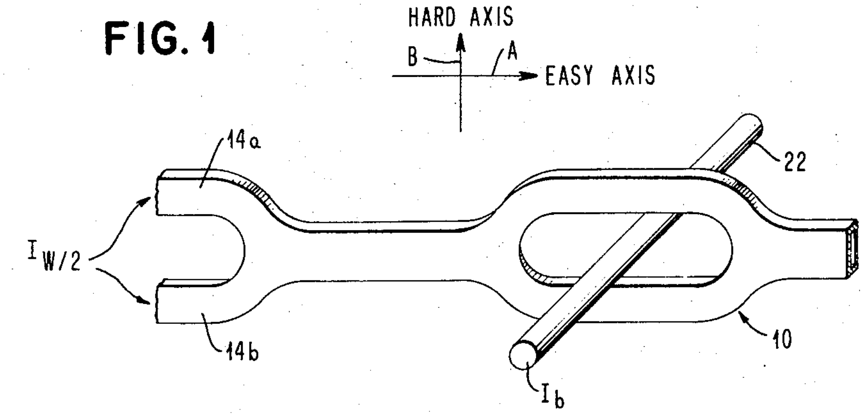
FIGURE 1 is an isometric diagram of the substrate utilized in the deposition of the magnetic thin film in accordance with the invention.

Now, speaking more particularly as to the formation of a magnetic thin film for a storage device by the novel solution and process of this invention, reference is made to FIGURE 1. There a conductive strip in the form of a chain-like configuration is shown on the surface of which the magnetic thin film is electrolessly deposited. FIGURE 1 shows several elements 10 of the chain-like configuration which include toroidal or elliptically shaped portions 14 which are coupled by neck portions 11. The toroidal or elliptically shaped portions 14 form the storage units. Of course it will be recognized that although only two storage units are shown in the chain-like configuration, it will be understood that many such units may form part of one chain-like structure.

In forming the substrate, that is, the conductive strip 10, 2 ounce (0.0028 inch in thickness) rolled copper foil or beryllium-copper is preferred although, as heretofore indicated, any catalytic surface is usable. The copper foil is cleaned in a 10% solution of hydrochloric acid, rinsed with water, and dried. Conventional photoresist is applied and the material is then exposed with positive art work to xenon arc lamp or equivalent light source for a few seconds. The material is then etched in 30° Bé. ferric chloride, immersed in photographic fixer and the required chain-like structure developed according to standard techniques in the art.

After this, the chain-like structure is again rinsed in hydrochloric acid and washed in water. The substrate is then immersed for about 15 seconds, for sensitizing into a solution that contains 1 gram of purified palladium chloride, 1 milliliter of concentrated hydrochloric acid, and 1000 milliliters of water, which solution is at room temperature. Thereafter the chain-like structure is again rinsed with water.

The substrate is then immersed in the electroless solution in accordance with the invention and the magnetic thin film electrolessly formed thereon. The composition of the electroless solution contains the chemical species and constituents in the concentrations as depicted in the following table. Of course it is to be realized that the examples that follow are given by way of illustration and explanation only and are not intended in any way to limit the inventive contribution to the specific examples set forth. In each instance the minimum, optimum and maximum concentration for each chemical specie or ion constituent is given below in the table.

TABLE I

| Constituent | Mols/Liter×$10^{-3}$ | | |
|---|---|---|---|
| | Min. | Preferred | Max. |
| Nickel [Ni (II)] | 1.87 | 5.63 | 16.89 |
| Iron (Fe (III)] | 1.79 | 7.11 | 10.79 |
| Hypophosphite $H_2PO_2$ | 0.29 | 53.8 | 100.1 |
| Tartrate $C_4H_4O_6$ | 35.5 | 64.0 | 106.6 |
| Ni (II)/Fe (III) ratio | 4.78 | 10.3 | 31.4 |
| Ammonium hydroxide $NH_4OH$ (30%) $NH_3$ (at a specific gravity of 0.9) (ml./l.) | 230 | 230 | 230 |
| Temperature, ° C. | 65 | 65 | 75 |
| Time, minutes | 40 | 80 | 100 |
| pH | 8 | 10.5 | 13.5 |

As brought out in the examples above, the nickel to iron ratio [Ni(II)/Fe(III)] varies from about 4.5 to about 31; the hypophosphite anion has a lower limit of about $0.29\times10^{-3}$ mols; per liter and an upper limit of about $100\times10^{-3}$ mols per liter; the pH may vary from 8 to essentially 14. It is also to be noted that the table includes as complexing agents ammonia, ammonium and tartaric salts. In this regard, the complexing agent need only be capable of forming a stable water-soluble complex with nickel and iron and is preferably selected from the group consisting of ammonia and organic complex-forming compounds having at least one functional group selected from the group consisting of amino, imino, carboxy, and hydroxy radicals in concentrations ranging from about $35.5\times10^{-3}$ mols per liter to about $107\times10^{-3}$ mols per liter. The electroless deposition reaction is conducted at temperatures varying from about 40° C. to about 90° C. but desirably at a temperature between 65° C. to 75° C. and preferably at about 65° C. Lastly note that the nickel [Ni(II)] varies from about $1.87\times10^{-3}$ mols per liter to about $17\times10^{-3}$ mols per liter while the iron [Fe(III)] varies from about $1.7\times10^{-3}$ mols per liter to about $11\times10^{-3}$ mols per liter but preferably the former is maintained at a concentration of about $5.63\times10^{-3}$ mols per liter and the latter at about $7.11\times10^{-3}$ mols per liter.

At this junction in the description of the particulars of the invention, a few remarks concerning further details of the operation of the storage device, formed in accordance with the present invention, may serve to pictorially illustrate the terminology used in the art and thereby be of assistance in placing the inventive contribution in proper perspective.

As heretofore described, the storage device is in the form of a chain-like element 10 containing toroidal or elliptical portions 14 connected by neck portions 11. The Permalloy film that is electrolessly deposited in accordance with the invention is placed over the surface of the chain-like structure depicted in FIGURE 1. During the electroless deposition of the film an external field is preferably applied along the axis of the chain to establish the axis of magnetization; this is the easy, or preferred, axis and is the rest position of the magnetization. When the film is not under the influence of an external field, the magnetization lies along the easy axis. The easy and hard axes are orthogonal in a storage array and the rest state of the magnetization vector is along the easy axis.

The hysteresis loop of the easy axis is characterized by a square loop wave function and the coercivity of the loop designated $H_c$. The hysteresis characteristics of the hard axis are nearly linear and are distinguished by an anisotropy field value $H_k$. The easy and hard directions are depicted by arrows A and B above device 10. An external field greater than $H_k$ applied along the hard axis causes the magnetization to rotate into alignment with the field in the hard direction.

While the preceding description holds for many magnetic storage devices, the device depicted above is a three-dimensional element and offers the advantage of a closed flux structure in both the word and bit dimension. The hard direction in the chain lies orthogonal to the physical axis of the chain (arrow B), a field in the hard direction is developed by passing a current ($I_w$) through the substrate of the element itself in the direction of arrow A. The current flows into the two legs of the device $I_w/2$ in each leg 14*a* and 14*b*. The current generates the required hard axis field in the film orthogonal to the axis of the chain. The easy axis field is developed by passing current $I_0$ through conductor 22, threaded through the aperture of the toroid or elliptical member 14. This provides the required external easy axis field needed for orthogonal operation.

As briefly alluded to above, $H_k$ is the anisotropy field. It is the field required to rotate the magnetization coherently from the easy to the hard direction against a uniaxial anisotropy: that is the field required to rotate the magnetic dipole alignment from arrow A to arrow B. Now the anisotropy in many films is specially dispersed there being changes in the orientation and magnitude of the anisotropy from place to place in the film. This dispersion is broadly divided into two groups: the first is designated long wave length dispersion in which the easy direction changes its orientation slowly over distances greater than about 1 millimeter and is generally called in the art, skew; the second type, short wave length dispersion, occurs on the scale of very much less than 1 millimeter and briefly designates the variance of the magnetization vector in elemental magnetic sections from region to region within the film. The value of these parameters is of significance in evaluating the adaptability of a magnetic thin film for storage and switching application.

As brought out above, the preferred molar ratio of the nickel cations [Ni(II)] to ferric [Fe(III)] cations is approximately 10:1. The hypophosphite ion concentration is preferably maintained at about 0.05 mol per liter and the initial pH adjusted to about 10.5 in order to bring about the optimum characteristics available from the electroless solution.

To further illustrate the practice of the present invention, further examples are given wherein the salt in which the cations and anions are derived is specifically indicated and the concentrations given in mols per liter. As with the previous examples, the values given in the chart are multiplied by a factor of $10^{+3}$. Accordingly, actual molar concentrations are obtained from the chart by multiplying the valve indicated by $10^{-3}$. Thus, for example, the actual maximum concentration of the $NiCl_2 \cdot 6H_2O$ is 0.0562 mol per liter.

TABLE II

| Constituent | Mols/Liter×$10^{-3}$ (as ions) | | |
|---|---|---|---|
| | Max. | Preferred | Min. |
| $NiCl_2 \cdot 6H_2O$ | 56.2 | 56.2 | 56.2 |
| $NaH_2PO_2 \cdot H_2O$ | 50.7 | 50.7 | 50.7 |
| $NaKC_4H_4O_6 \cdot 4H_2O$ | 107.9 | 89.5 | 85.8 |
| $NH_4OH$ (28–30% $NH_3$) specific gravity 0.9 (ml./l.) | 230 | 230 | 230 |
| $FeNH_4(SO_4)_2 \cdot 12H_2O$ | 10.79 | 8.95 | 7.15 |
| Temperature, ° C | 65 | 75 | 65 |
| pH | 10.5 | 10.5 | 10.5 |
| Ni (II)/Fe (III) ratio | 4.78 | 6.32 | 7.90 |
| Plate time, min | 80 | 40 | 80 |
| $NiCl_2 \cdot 6H_2O$ | 56.2 | 56.2 | 56.2 |
| $NaH_2PO_2 \cdot H_2O$ | 50.7 | 50.7 | 50.7 |
| $NaKC_4H_4O_6 \cdot 4H_2O$ | 107.3 | 134.3 | 147.8 |
| $NH_4OH$ (28–30% $NH_3$) specific gravity 0.9 (ml./l.) | 230 | 230 | 230 |
| $FeNH_4(SO_4)_2 \cdot 12H_2O$ | 8.95 | 8.95 | 9.85 |
| Temperature, ° C | 65 | 75 | 75 |
| pH | 10.5 | 10.5 | 10.5 |
| Ni (II)/Fe (III) ratio | 6.32 | 6.32 | 5.72 |
| Plate time, min | 80 | 40 | 40 |

Figure 2:
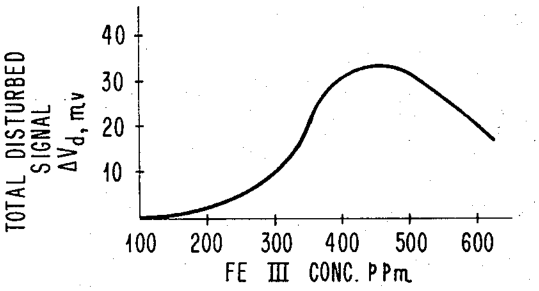
FIGURE 2 shows a graph depicting the variation of signal output as the concentration of ferric cations increases.

As shown in FIGURE 2, which presents a graphical representation of the relation of total disturb signal $\Delta V_d$ in millivolts (mv.), as the ordinate, against ferric ion Fe (III) concentration in parts per million (p.p.m.) as the abscissa, it is seen that the effect of the ferric ions is most pronounced on the signal output. Note that signal output increases as the Fe (III ion concentration increases. Note that as the concentration of Fe (III) ions approaches 600 parts per million, optimum conditions begin to fall off.

Figure 3:
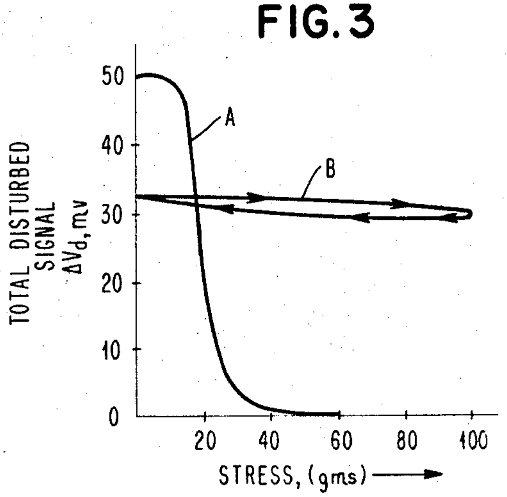
FIGURE 3 shows a variation of signal output as a function of applied stress for films in accordance with the present invention and by other techniques.

The advantages of forming a magnetic thin film of the Permalloy type from an electroless solution that contains iron as the ferric cation only is brought out by the graphs of FIGURE 3. There the ordinate of the graph is the disturb signal output $\Delta V_d$ in millivolts (mv.) whereas the abscissa is the stress applied in grams. Curve A of the graph is obtained from a magnetic thin film formed from an electroless solution wherein the aqueous salt for the iron cation yields ferrous ions or mixtures of salts which yield ferrous [Fe (II)] and ferric [Fe (III)] ions. Curve B, on the other hand, is for a magnetic thin film storage device formed from electroless solution wherein the iron cation produced on ionization of the soluble salts is the Fe (III) alone or, in the alternative, it is formed from an electroless solution that contains the nickel cations in the valence state Ni (II) and ferric cations in the valence state Fe (III). Note that the signal output for curve A drops rapidly as the stress applied to the storage device is increased. On the other hand, curve B remains fairly level. While the initial signal output of curve B is not that of curve A, the device of curve B has the distinctive advantage of not experiencing any notable loss of signal output compared to the film represented by curve A. The stress measurements were made with magnetic thin film storage devices such as that depicted in FIGURE 1: one end of the device was placed in tension whereas the other end was held fast, electrical sensing equipment was placed about the device in order to detect the signal output as the device was driven to rotate the magnetic dipoles as hereafter discussed.

Figure 4:
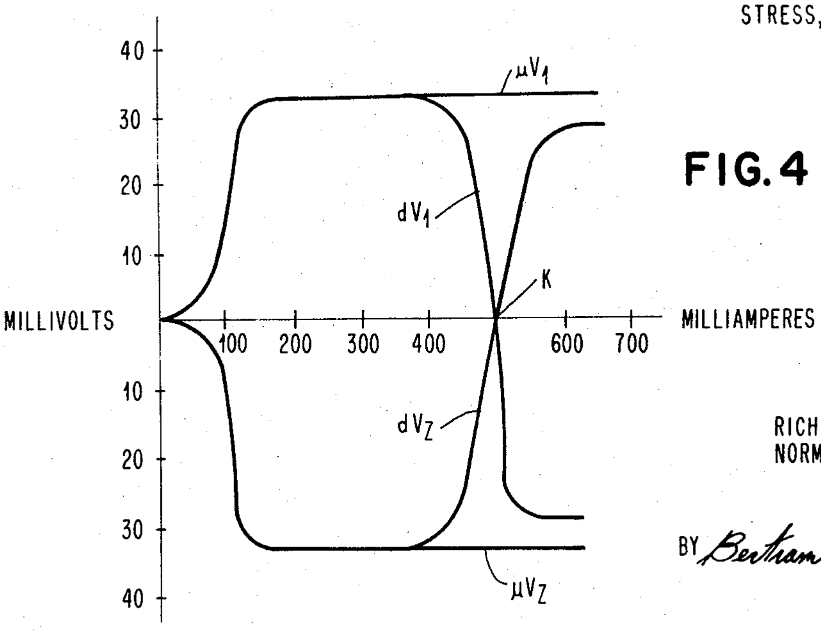
FIGURE 4 is a graphical representation in the form of S-curves of the magnetic characteristics of electrolessly deposited magnetic films in accordance with the present invention.

S-curves as depicted in FIGURE 4 were plotted for the magnetic thin films coated on the substrate as produced as heretofore described. These curves are valuable in ascertaining the type of magnetic characteristics which are available from the device electrolessly coated in accordance with the present invention.

These curves are obtained with a constant word pulse while varying the bit pulse. The storage element of FIGURE 1 is switched, that is, the magnetic remanence switched from one stable state to the other by the application of longitudinal and transverse pulses: the magnetic dipole alignment is rotated. The longitudinal pulse, the word pulse $I_w$, is applied along the longitudinal axis of the element, that is, along the direction indicated by arrow A, while the transverse pulse, the bit pulse $I_b$, is applied along conductor 22 (shown for one element) through the aperture of the element. To write in the element, a unipolar word pulse of about 640 milliamperes in amplitude and 20 nanoseconds rise time is passed along the longitudinal axis of the element. A bit current with a time lag of about 55 nanoseconds is passed through conductor 22 going through the aperture of the element. The bit current has an amplitude increasing from zero to 600 milliamperes and a rise time of 30 nanoseconds. Reading is accomplished on the leading edge of the word pulse while writing is performed when the word pulse and bit pulse overlap. By maintaining the word pulse constant and varying the bit pulse over the ranges indicated in FIGURE 4, the waveforms for the undisturbed one signals ($uV_1$) is produced. To obtain the waveform for the disturbed one signal $dV_1$, the same procedure as for the undisturbed one signal $uV_1$ is followed, but, after the bit pulse is applied, the stored information is disturbed by applying from 500 to 1000 bit pulses of the appropriate polarity and of amplitude to 20% higher than the previous bit pulse with a rise time of 30 nanoseconds. The undisturbed zero $uV_z$ is produced, as the undisturbed one $uV_1$, but the polarity of the bit pulse is reversed to that of the polarity for the undisturbed one $uV_1$. Similarly, the disturb zero $dV_z$ is plotted in a similar fashion to the disturbed one $dV_1$, with the polarities of the bit pulse being reversed as described for the undisturbed one $uV_1$.

The available one-to-zero difference signal for sensing intelligence in the operation of the storage element is depicted by these wave forms. What is desired, in such an S-curve, is that the disturbed one $dV_1$ and zero signals $dV_z$ be large over a wide range of bit currents and, in particular, it is desired that the signals be large at low bit currents, that is, the curves rise fast from the origin. It is also desired that the curve of the disturbed one $dV_1$ be fairly close to the curve of the undisturbed one $uV_1$ signal and, similarly, that the disturbed zero $dV_z$ curve be fairly close to the undisturbed zero $uV_z$ curve. Further, it is desired that the cross-over point for the disturbed one $dV_1$ and disturbed zero $dV_z$, that is, the point K where the disturb one $dV_1$ and disturb zero $dV_z$ touch the abscissa of the graph, be maximized as far to the right from the origin as feasible. As these conditions are obtained with the S-curve, large zero and one signals are obtained, a wide range of bit currents including bit currents of low amplitude are available for switching the intelligence in the memory element, lowering the uniformity requirements for the elements in a large memory. Also, the intelligence in the storage element is not readily eliminated by accidentally applied stray fields or through the influence of adjacent fields. On the other hand, if these conditions are not met by the S-curve, that is, if the disturbed zero $dV_z$ and disturbed one $dV_1$ signals are small, if they are not of approximately the same signal magnitude, if the range of bit currents yielding large one and zero signals is narrow, or the cross-over point is not maximized to the right, the film yields a low signal on sensing and it requires very uniform memory elements with exactly the same range of usable bit currents. Further, the element has little resistance to the influence of stray fields.

The difference signal for the device is about 30 to 40 millivolts over a range of bit currents of about 500 milliamperes. Note that the leading edge of the S-curves has a large slope and opens rapidly; this is a manifestation that the device has low dispersion throughout the electrolessly formed coating. In addition, the close symmetry between the disturb and undisturbed signals reveals that the device has little, if any, skew. These comparisons were made with elements such as that shown in FIGURE 1 which were of about 0.02 inch outer diameter, 0.015 inner diameter, and which had a thickness of about 0.0025 inch. The thickness of the electroless deposit was about 18,000 A. and the composition of the magnetic films contained about 28 percent iron, 71.5 percent nickel and about 0.5 percent phosphorus.

The Ni (II) and Fe (III) ions are supplied in the form of any water soluble salts such as chlorides, sulfates, acetates, sulfamates and mixtures thereof as long as the anions do not interfere with the deposition. More particularly, the ferric ion is furnished in the form of ferric ammonium sulfate, ferric chloride, ferric sulfate, and ferric nitrate. Any water soluble iron salt is usable that yields ferric ions in solution, provided the salt is compatible with the other ion species present. Similarly, the hypophosphite ions are furnished in the form of water soluble salts of various bases such as sodium hypophosphite, potassium hypophosphite, hypophosphorus acid, and mixtures thereof.

Although it is preferred to use complexing and sequestering agents such as ammonia and sodium potassium tartrate, organic reagents which contain one or more of the following functional groups in concentrations that range from $35.5\times10^{-3}$ mols per liter to $107\times10^{-3}$ mols per liter and preferably at about $65\times10^{-3}$ mols per liter: primary amino group (—$NH_2$), secondary amino group (>NH), tertiary amino group (>N—), imino group (=NH), carboxy group (—COOH), and hydroxy group (—OH). The preferred agents include rochelle salt, seignette salt, ammonia, ammonia hydroxide and ammonium chloride.

Similarly, various alkalizing agents may be added which include all the complexing agents heretofore listed, which in aqueous solution have a basic reaction and in addition all water soluble bases such as sodium potassium, and lithium hydroxide, and the like.

Surface active substances may be added such as sodium lauryl sulfate, as long as the substances do not interfere with the plating reaction. Exaltants also may be added to increase the rate of deposition by activating the hypophosphite anions such as succinic acid, adipic anions, alkali fluorides and other exaltants which are known to those in the art. Stabilizers may be added in minute concentrations such as 10 parts per billion. These may be stabilizers such as thiourea, sodium ethylxanthate, lead sulfate and the like. Also, pH regulators and buffers such as boric acid, disodium phosphate and others may be included in the solution.

Other metal ions may be added to the electroless solution in their lowest oxidation states, such as cobalt [Co (I)], molybdenum [Mo (I)], chromium [Cr (II)], and the like. These cations increase the coercive force of the films and thereby increase the stability against disturb fields.

What has been described is a low disturb and high signal ferromagnetic film suitable for computer and data processing application of 15 to 35 percent by weight iron, 65 to 85 percent by weight nickel, and 0.25 to 2 percent by weight phosphorus. These films are formed with either isotropic or anisotropic properties depending on whether a field is applied during the formation process. The film is the product of a chemical reduction process where hypophosphite is used. It will be recognized that other reducing agents such as hydrazine and borohydride and the like are capable of reducing nickel and iron in an electroless solution but the magnetic characteristics of these films are not as suitable for the intended applications.

For ferromagnetic films of the present invention with the composition 15 to 35 percent by weight iron, 65 to 85 percent by weight nickel and 0.25 to 2 percent by weight phosphorus, the magnetic remanence ($B_r$) varies from about 0.05 to about 0.35 maxwells, the coercivity varies from about 2 to about 6 oersteds and the switching speed, that is, the time it takes for the magnetization to reverse its direction by about 180° under an applied field of 20 oersteds, is from about 2 to 6 nanoseconds. With these properties, storage and switching elements are furnished for use in data processing and computer machines which exhibit characteristics heretofore not available in the industry.

While the desirable magnetic characteristics are exhibited for memory and switching elements by ferromagnetic films containing 15 to 35 percent by weight iron, 65 to 85 percent by weight nickel, and 0.25 to 2 percent by weight phosphorus, greater signal differences are available with ferromagnetic films containing 24 to 35 percent by weight iron, 65 to 76 percent by weight nickel, and 0.25 to 2 percent by weight phosphorus. The optimum characteristics for use in data processing and computer machines are obtained with a ferromagnetic film that contains 28 to 30 percent by weight iron, 70 to 72 percent by weight nickel, and 0.25 to 2 percent by weight phosphorus. These ferromagnetic films provide magnetic characteristics heretofore not available in the art.

While the invention has been particularly shown and described with reference to preferred embodiments thereof, it will be understood by those skilled in the art that various changes in form and details may be made therein without departing from the spirit and scope of the invention.

What is claimed is:

1. An aqueous solution for electrolessly plating a magnetic material having enhanced magnetic properties comprising:

water soluble nickel and iron salts in concentrations sufficient to provide a nickel to ferric ion ratio in the range between 4.5:1::31:1;

an amount of hypophosphite ions up to $100 \times 10^{-3}$ mols/liter sufficient to reduce said nickel and ferric ions; and sufficient hydroxyl ions to maintain the pH at at least 8.

2. An aqueous solution for electrolessly plating a magnetic material having enhanced magnetic properties comprising:

water soluble salts of nickel and iron in concentrations sufficient to provide a nickel to ferric ion ratio in the range between 4.5:1::31:1;

hypophosphite ions in a concentration in the range between $0.29 \times 10^{-3}$ mols per liter to about $100 \times 10^{-3}$ mols per liter;

a metal complexing agent capable of forming a stable water soluble complex with nickel and iron selected from the group consisting of ammonia and organic complex-forming compounds having at least one functional group selected from the group consisting of amino, imino, carboxy and hydroxy radicals in concentrations ranging from $35.5 \times 10^{-3}$ mols per liter to about $107 \times 10^{-3}$ mols per liter; and, sufficient hydroxyl ions in concentrations to maintain the pH at at least 8.

3. An aqueous solution for electrolessly plating a magnetic material having enhanced magnetic properties comprising:

water soluble salts of nickel and iron in concentrations sufficient to provide a nickel to ferric ion ratio in the range between 4.5:1::31:1 where the nickel ions are in concentrations ranging from between $1.8 \times 10^{-3}$ mols per liter to $17 \times 10^{-3}$ mols per liter, the ferric ions are in concentrations in the range between $1.7 \times 10^{-3}$ mols per liter to about $11 \times 10^{-3}$ mols per liter;

hypophosphite ions in a concentration in the range between $0.29 \times 10^{-3}$ mols per liter to about $100 \times 10^{-3}$ mols per liter;

tartrate ions in a concentration in the range between $35.5 \times 10^{-3}$ mols per liter to about $107 \times 10^{-3}$ mols per liter;

sufficient ammonium ions to form the nickel hexammine complex ion in the solution; and, sufficient hydroxyl ions in concentrations to maintain the pH at at least 8.

4. An aqueous solution for electrolessly plating a magnetic material having enhanced magnetic properties comprising:

water soluble salts of nickel and iron in concentrations sufficient to provide a nickel to ferric ion ratio of about 10 to 1 where the nickel ions are in concentrations ranging from between $1.8 \times 10^{-3}$ mols per liter to $17 \times 10^{-3}$ mols per liter, the ferric ions are in concentrations in the range between $1.7 \times 10^{-3}$ mols per liter to about $11 \times 10^{-3}$ mols per liter;

hypophosphite ions in a concentration of about $54 \times 10^{-3}$ mols per liter;

sufficient ammonium ions to form the nickel hexammine complex ion in solution; and, sufficient hydroxyl ions in concentrations to maintain the pH at at least 10.5.

5. A process for electrolessly depositing a magnetic material having enhanced magnetic properties on a substrate by the step of:

immersing said substrate into a solution containing water soluble salts of nickel and iron in concentrations sufficient to provide a nickel to ferric ion ratio in the range between 4.5:1::31:1, an amount of hypophosphite ions in a concentration up to $100 \times 10^{-3}$ mols/liter sufficient to reduce said nickel and ferric ions and sufficient hydroxyl ions in concentrations to maintain the pH at at least 8.

6. A process for electrolessly plating a magnetic material having enhanced magnetic properties on a substrate by the steps of:

immersing said substrate in a solution containing water soluble salts of nickel and iron in concentrations sufficient to provide a nickel to ferric ion ratio in the range between 4.5:1::31:1, hypophosphite ions in a concentration in the range between $0.29 \times 10^{-3}$ mols per liter to about $100 \times 10^{-3}$ mols per liter, metal complexing agents capable of forming a water soluble complex with nickel and iron selected from the group consisting of ammonia and organic complex-forming compounds having at least one functional group selected from the group consisting of amino, imino, carboxy and hydroxy radicals in concentrations ranging from $35.5 \times 10^{-3}$ mols per liter to about $107 \times 10^{-3}$ mols per liter; and, maintaining the pH of said solution at at least 8 to permit the deposition of the magnetic material on the substrate.

7. A process for electrolessly depositing a magnetic material having enhanced magnetic properties on a substrate by the steps of:

immersing said substrate in an aqueous solution containing water soluble salts of nickel and iron in concentrations sufficient to provide a nickel to ferric ion ratio in the range between 4.5:1::31:1, hypophosphite ions in a concentration in the range between $0.29 \times 10^{-3}$ mols per liter to about $100 \times 10^{-3}$ mols per liter, tartrate ions in a concentration in the range between $35.5 \times 10^{-3}$ mols per liter to about $107 \times 10^{-3}$ mols per liter, sufficient ammonium ions to form the nickel hexammine complex ion in the solution, and, maintaining the pH of said solution at at least 8 to permit the deposition of a nickel-iron phosphorus alloy on the surface of the substrate.

8. A process for electrolessly depositing a magnetic material having enhanced magnetic properties on a substrate by the steps of:

immersing said substrate in an aqueous solution containing water soluble salts of nickel and iron in concentrations sufficient to provide a nickel to ferric ion ratio of about 10 to 1, hypophosphite ions in a concentration of about $54 \times 10^{-3}$ mols per liter, sufficient ammonium ions to form the nickel hexammine complex ion in the solution; and, maintaining the pH of said solution at about 10.5 to permit the deposition of a nickel-iron phosphorus alloy on the surface of the substrate.

9. A process for electrolessly depositing a nickel-iron-phosphorus film on an electrically conductive substrate where the composition of said film ranges from between 15 to 35 percent iron, 65 to 85 percent nickel, and 0.25 to 2 percent by weight phosphorus, said process comprising the steps of:

immersing said electrical conductive substrate in an aqueous solution containing water soluble salts of nickel and iron in concentrations sufficient to provide a nickel to ferric ion ratio in the range between 4.5:1::31:1, hypophosphite ions in a concentration in the range between $0.29 \times 10^{-3}$ mols per liter to about $100 \times 10^{-3}$ mols per liter, tartrate ions in a concentration in the range between $35.5 \times 10^{-3}$ mols per liter to about $107 \times 10^{-3}$ mols per liter, and sufficient ammonium ions to form the nickel hexammine complex ion in the solution; and, maintaining the pH of said bath at at least 8.

10. A process for electrolessly depositing a nickel-iron-phosphorus film on an electrically conductive substrate where the composition of said film ranges from between 15 to 35 percent iron, 65 to 85 percent nickel, and 0.25 to 2 percent by weight phosphorus, said process comprising the steps of:

immersing said electrical conductive substrate in an aqueous solution containing water soluble salts of nickel and iron in concentrations sufficient to provide a nickel to ferric ion ratio in the range between 4.5:1::31:1, a nickel [Ni (II)] concentration in the range between $1.8 \times 10^{-3}$ mols per liter to $17 \times 10^{-3}$ mols per liter, a ferric [Fe (III)] ion concentration in the range between $1.7 \times 10^{-3}$ mols per liter to $11 \times 10^{-3}$ mols per liter, hypophosphite ions in a concentration in the range between $0.29 \times 10^{-3}$ mols per liter to about $100 \times 10^{-3}$ mols per liter, tartrate ions in a concentration in the range between $35.5 \times 10^{-3}$ mols per liter to about $107 \times 10^{-3}$ mols per liter, and sufficient ammonium ions to form the nickel hexammine complex ion in the solution; and, maintaining the pH of said bath at at least 10.5.

References Cited

UNITED STATES PATENTS

| | | | |
|---|---|---|---|
| 2,827,399 | 3/1958 | Eisenberg | 106—1 X |
| 3,178,311 | 4/1965 | Cann | 106—1 X |
| 3,234,031 | 2/1966 | Zirngiebl et al. | 106—1 |
| 3,255,033 | 6/1966 | Schmeckenbecher | 106—1 X |
| 3,265,511 | 8/1966 | Sallo | 106—1 |
| 3,268,353 | 8/1966 | Melillo | 117—130 X |
| 3,282,723 | 11/1966 | Melillo | 117—130 X |

ALEXANDER H. BRODMERKEL, *Primary Examiner.*

L. B. HAYES, *Assistant Examiner.*